(12) United States Patent
Ward

(10) Patent No.: US 6,526,411 B1  
(45) Date of Patent: Feb. 25, 2003

(54) SYSTEM AND METHOD FOR CREATING DYNAMIC PLAYLISTS

(76) Inventor: Sean Ward, 14 W. Cedar St., Alexandria, VA (US) 22301

( * ) Notice: Subject to any disclaimer, the term of this patent is extended or adjusted under 35 U.S.C. 154(b) by 260 days.

(21) Appl. No.: 09/712,261

(22) Filed: Nov. 15, 2000

Related U.S. Application Data

(60) Provisional application No. 60/165,726, filed on Nov. 15, 1999, provisional application No. 60/165,727, filed on Nov. 15, 1999, and provisional application No. 60/166,039, filed on Nov. 17, 1999.

(51) Int. Cl.[7] .............................................. G06F 17/30
(52) U.S. Cl. ...................................... 707/102; 707/104.1
(58) Field of Search ................................ 707/104.1, 102

(56) References Cited

U.S. PATENT DOCUMENTS

| | | |
|---|---|---|
| 5,157,643 A | 10/1992 | Suzuki |
| 5,341,350 A | 8/1994 | Frank et al. |
| 5,408,448 A | 4/1995 | Carman |
| 5,633,839 A | 5/1997 | Alexander |
| 5,668,788 A * | 9/1997 | Allison ........................ 345/173 |
| 5,696,919 A | 12/1997 | Masuno et al. |
| 5,749,081 A | 5/1998 | Whiteis |
| 5,793,980 A | 8/1998 | Glaser et al. |
| 5,867,799 A | 2/1999 | Lang et al. |
| 5,872,747 A | 2/1999 | Johnson |
| 5,872,850 A | 2/1999 | Klein et al. |
| 5,918,223 A | 6/1999 | Blum et al. |
| 5,930,768 A | 7/1999 | Hooban |
| 5,959,945 A | 9/1999 | Jkeunab |
| 5,983,214 A | 11/1999 | Lang et al. |
| 5,986,979 A | 11/1999 | Bickford et al. |
| 5,987,525 A | 11/1999 | Roberts et al. |
| 6,025,838 A | 2/2000 | Bardon et al. |
| 6,029,161 A | 2/2000 | Lang et al. |
| 6,041,311 A | 3/2000 | Chislenko et al. |
| 6,049,777 A | 4/2000 | Sheena et al. |
| 6,061,680 A | 5/2000 | Scherf et al. |
| 6,092,049 A | 7/2000 | Chislenko et al. |
| 6,118,450 A * | 9/2000 | Proehl et al. ................ 345/810 |
| 6,154,773 A | 11/2000 | Roberts et al. |
| 6,192,340 B1 * | 2/2001 | Abecassis ................ 455/185.1 |
| 6,230,192 B1 | 5/2001 | Roberts et al. |
| 6,230,207 B1 | 5/2001 | Roberts et al. |
| 6,240,459 B1 | 5/2001 | Roberts et al. |
| 6,356,971 B1 * | 3/2002 | Katz et al. ................... 710/301 |
| 6,421,651 B1 * | 7/2002 | Tedesco et al. ................ 705/5 |

* cited by examiner

Primary Examiner—Safet Metjahic  
Assistant Examiner—Sana AL-hashemi  
(74) Attorney, Agent, or Firm—Miles & Stockbridge P.C.; Edward J. Kondracki

(57) ABSTRACT

Method and system provided for creating a dynamic playlist including meta-data having potential association with a respective content item configured to be played on a content player, and having dynamic addition of subtraction of playlist items. The system maintains a database of linkages between elements associated with content items as well as weighted linkages between elements and respective properties. The system is a hybrid content based and collaborative filtering system, wherein the insertion of a new item into the database results in the new item sharing preference weights and number of preferences associated with items pre-existing in the database. Thus, an initial input query list of items potentially results in the return of many content, called a "dynamic playlist", has a high correlation with the user's preference or with whatever other basis was used to frame the input list, and individual content items on the dynamic playlist may not have been previously experienced by the user.

24 Claims, 7 Drawing Sheets

SYSTEM AND METHOD FOR CREATING DYNAMIC PLAYLISTS

CROSS-REFERENCE TO RELATED APPLICATIONS

The present application claims the benefit of U.S. Provisional Application No. 60/165,726 filed Nov. 15, 1999. That application and the present inventor's U.S. Provisional Application Nos. 60/165,727 and 60/166,039 filed respectively on Nov. 15, 1999 and Nov. 17, 1999 are hereby incorporated by reference. The present application also incorporates by reference the present inventor's application Ser. No. 09/712,261 and the No. 60/165,727 Provisional Application) filed concurrently herewith.

BACKGROUND OF THE INVENTION

1. Field of the Invention

The present invention relates generally to a system and method for music and/or video playback, and more particularly, providing to the user recommendations of items which have not yet been sampled by the user, based on a list of items already sampled by the user, utilizing a method for the dynamic addition, subtraction and sorting of a queue of items for playback.

2. Description of Related Art

The concept of a playlist is old, i.e. a static list of items to be played one by one through its entirety, in the order listed in the playlist. So far, only rudimentary attempts at dynamic playback have been made, consisting mainly of randomizing the order in which selections from the playlist are played. Some attempts have been made to let people quickly create playlists based on particular artists, or albums, or styles of music. However, all of them are still a static list after they are created, and don't automatically reorder themselves in a pleasing way, or incorporate new content which would fit with them as it is made available. Additionally, any slightly complex concept such as building a playlist which contains more than one piece of meta-data, such as, for example, more than one artist, typically requires complex Boolean logic statements to build, making such playlist creation processes inaccessible to those unskilled in Boolean techniques.

A system is needed that is easy to use, adapts to personal tastes, and can easily add or subtract music or videos, as they become available. Such a system should provide more than random sorting and shuffle-play options to overcome the deficiencies of a static playlist, so that the playlist becomes dynamic.

It is therefore a principal object of the present invention to provide a dynamic playlist system and method for a dynamic playlist of digital items that automatically adds items to, or subtracts items from, the playlist, as the items become available.

An object of the present invention is to provide the dynamic playlist system where the data items are music or video items.

Another object of the present invention is to provide a dynamic playlist that dynamically adapts to usage patterns.

Another object of the present invention is to provide a dynamic playlist that dynamically adapts to personal preferences.

Another object of the present invention is to provide a dynamic playlist that is easy to use.

SUMMARY OF THE INVENTION

The above objects are obtained according to the present invention in which a method and system is provided for creating a dynamic playlist including meta-data having potential association with a respective content item configured to be played on a content player.

The system maintains a database of linkages between elements associated with content items as well as weighted linkages between elements and respective properties. The system is a hybrid content based and collaborative filtering system, wherein the insertion of a new item into the database results in the new item sharing preference weights and number of preferences associated with items pre-existing in the database. Thus, an initial input query list of items potentially results in the return of many content items available from one or more content providers, wherein the retrieved content, called a "dynamic playlist", has a high correlation with the user's preference or with whatever other basis was used to frame the input list, and individual content items on the dynamic playlist may not have been previously experienced by the user.

A dynamic playlist is a list of items that can be played in linear order, as is done with a traditional playlist, or in more exotic sequences after application of sorting or ordering algorithms. User profiles can be applied to the sorting process, i.e., by ranking items based on the user's meta-data, which can include usage patterns or explicit preferences, and further, by order reflected by usage of other users.

The most useful aspect of a dynamic playlist is the dynamic addition and subtraction of playlist items. This is accomplished by accepting at least one meta category defined as a set of at least one criterion, where each criterion has a potential association with a content item, and retrieving from at least one content provider a first result set of meta-data fitting any of the criteria, wherein the first result set enables acquisition of content items to be played. Next, a filtered first result set is calculated by application of a collaborative filtering query algorithm to the first result set, and then the filtered first result set is added to the dynamic playlist. Next, the system seeds a next meta-category, if any, with the result set and repeating the retrieving, calculating, inserting and seeding steps until all meta-categories have been processed. In accordance with this method, an initial meta-category of selection preferences potentially results in the return of many content items available from one or more content providers, wherein the retrieved content has a high correlation with the user's preference or with whatever other basis was used to frame the meta-category.

The collaborative filtering query algorithm can be arranged to include the dynamic playlist itself, which becomes especially meaningful subsequent successive playlist updates. The algorithm can also include user play pattern data including manual intervention detected during playing of contents associated with the dynamic playlist, or rating data indicative of preference or distaste for selected content items.

The method for creating a dynamic playlist also includes accessing a database configured to include meta-data elements, wherein each element defines at least one relationship between a user and a respective content item, identifying at least one meta-category from the database, and updating the database to include at least parts of the dynamic playlist.

The method for creating a dynamic playlist also includes applying a reordering algorithm to the filtered first result set to obtain the dynamic playlist. The ordering algorithm is selected from a group of algorithms including a ranking algorithm, a random element removal algorithm, a retention of top N most popular elements algorithm, and a pairing sort algorithm.

In a separate embodiment, a respective second result set is obtained for each meta-category, wherein the respective second result set includes meta-data identifying all content items fitting any at least one criterion of each meta-category. An ordering algorithm is applied to the second result set to obtain the dynamic playlist.

The pairing sort algorithm begins with selecting a first and second item from the playlist, determining if both elements are in an elements table, inserting whichever element is missing into the elements table, incrementing by 1 a pair link between the first and second elements, and incrementing by 1 a counter associated with the second element. If a pair link exists between the first and second items, the algorithm inserts a new pair link of strength 1 between the first and second items and increments by 1 a counter associated with the second item. If a pair link does not exist between the first and second items, and if another item remains in the playlist, the algorithm identifies the first item as the second item and the other item as the second item. The sequence is repeated until no items remain in the playlist.

Alternatively, the input set can either be associated with other input sets by a profile ID, or be a seed user profile, i.e., a single individual or source that submits the input sets, or the input set is simply collected on a stand-alone basis. This allows the creation of aggregate profiles between a series of queries or seed actions. Finally, if the action is a query, several profile ID's could be used to create a composite view of the multiple profiles, such as, for example, to find a song both a husband and wife would enjoy.

The pairing sort algorithm as applied to at least one user profile begins with selecting a seed user profile, and processes the steps of comparing the seed user profile against all available profiles, ranking all compared profiles by similarity to the selected seed profile, clustering the most similar profiles with the seed profile, counting the frequency of all elements in the clustered profiles, building a hash profile of the most frequent items to represent each respective cluster, placing the respective hash profile in a hash table, removing the seed and clustered profiles from the profile list, identifying a next user profile, if available, as the seed user profile, and continuing the sequence until no profiles are available.

BRIEF DESCRIPTION OF THE DRAWINGS

These and other features of the present invention and the attendant advantages will be readily apparent to those having ordinary skill in the art, and the invention will be more easily understood from the following detailed description of the preferred embodiments taken in conjunction with the accompanying drawings, wherein like reference characters represent like parts throughout the several views.

DETAILED DESCRIPTION OF THE PREFERRED EMBODIMENTS

Figure 1:
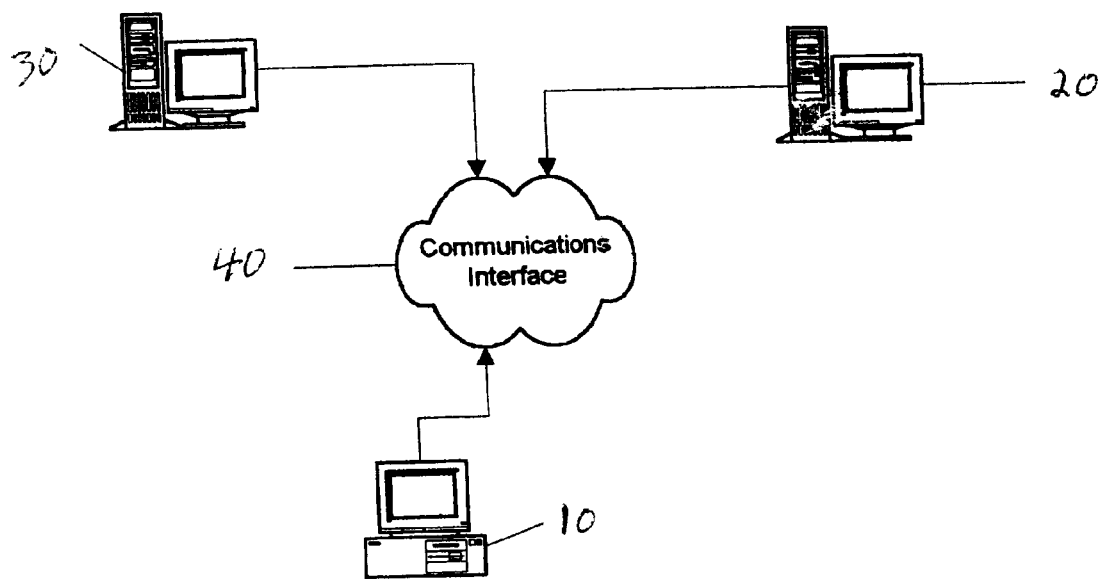
FIG. 1 is a highly simplified schematic drawing of components of the dynamic playlist system 100 according to the present invention.

A simplified arrangement of components of the dynamic playlist system 100 according to the present invention is schematically shown in FIG. 1, which includes a dynamic playlist content player 10, a content provider system 20, and a sort server 30, all interconnected by a communications interface 40. Any number of computers 10, 20, and 30 can be interconnected according to the present invention. For example, multiple client computers 10 can obtain content provided by one or more content provider computers 20.

Communications interface 40 can be any type of bus, local area network, wide area network, or a global network such as the Internet. Alternatively, communications interface 40 includes wireless communications, satellite connections, or any other connection means, and is not shown in detail as such interfaces are well-known and commonly used in conjunction with distributed systems.

In a dynamic playlist, the playlist items can be played in linear order, as is done with a traditional playlist, or in more exotic sequences after application of sorting or ordering algorithms. For example, the playlist items can be sorted by grouping frequency, i.e., application of a pairing sort to the items. User profiles can be applied to the sorting process, i.e., by ranking items based on the user's meta-data, as discussed later, in connection with FIG. 8. The items can be ranked by other user order frequencies, such as, for example, the order reflected in use by other users. While these all create a much more interesting playback order, somewhat like having a disk jockey who understands both the music/videos and the person listening/watching them, the most useful aspect of a dynamic playlist is the dynamic addition and subtraction.

Specifically, meta-elements can be added to the playlist, such as with music, the addition of an artist to the playlist. Then, when the playlist is used, the playlist queries a main server for the existence of content relating to that meta-data. I.e. adding an artist or group would add the entire given artist or groups content to the playlist, or would add the content not removed by anti-links (listed dislikes) existing in a user's profile. Additionally, it could be configured to add the content that was highest ranked as returned by a collaborative filtering query focused on the rest of the playlist's content, up to a certain number of songs. What this would allow is the creation of themed playlists that were random, yet fit together. Additionally, it would allow users to subscribe to artists and automatically have their playlists updated with new content, such as when an artist releases a new song, by having playlists which contained the meta-category of a particular artist included in their playlist. That would be a valuable opportunity for both users and artists to connect.

A playlist could also be made entirely of meta-elements. For example, it could contain two artists (a meta-category). First the system would build a result list of all the elements which have the meta-categories which are in the playlist, such as all the songs an artist has produced. Next, a collaborative filtering query could be executed on the result list, to rank and/or cull the items that the current user would most enjoy in the list. After that, various randomization or ordering algorithms could be applied to make the playlist "flow" in an effective manner from item to item. For example, the pairing sort described in FIG. 6, to be described later, could be executed. A playlist made in that manner would be fresh each time it was played, as it would pick new content and alter its playback order each time it was used.

Figure 6:
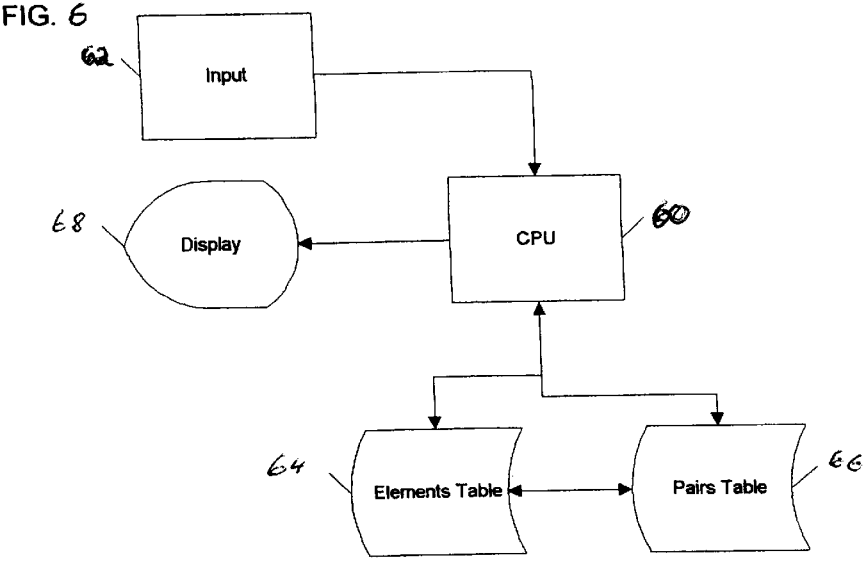
FIG. 6 is a schematic drawing of a sample pairing sort system according to the present invention.

Additionally, several ranking and/or culling techniques can be applied to the generated playlists before or during playback. For example, a pairing order sort could be applied to the playlist, which would have the effect of ordering it in the most popular order. Therefore, musical pieces could be ordered to flow in the manner that most people have ordered them, which will most likely result in the most compatible ordering. A sample pairing sort routine is shown in FIG. 6, to be described later. Additionally, the most incompatible elements could optionally be discarded from the sorted list.

As another example, a popularity sort could also be applied, wherein the results are then ranked based on overall popularity among all listeners, or the subset closest to the current playlist creator. As another option, the least popular items could be culled, or given higher weightings if the user desired. Other common sort mechanisms, such as by artist, random, meta-category, least popular, or album ordered could also be implemented.

Figure 2:
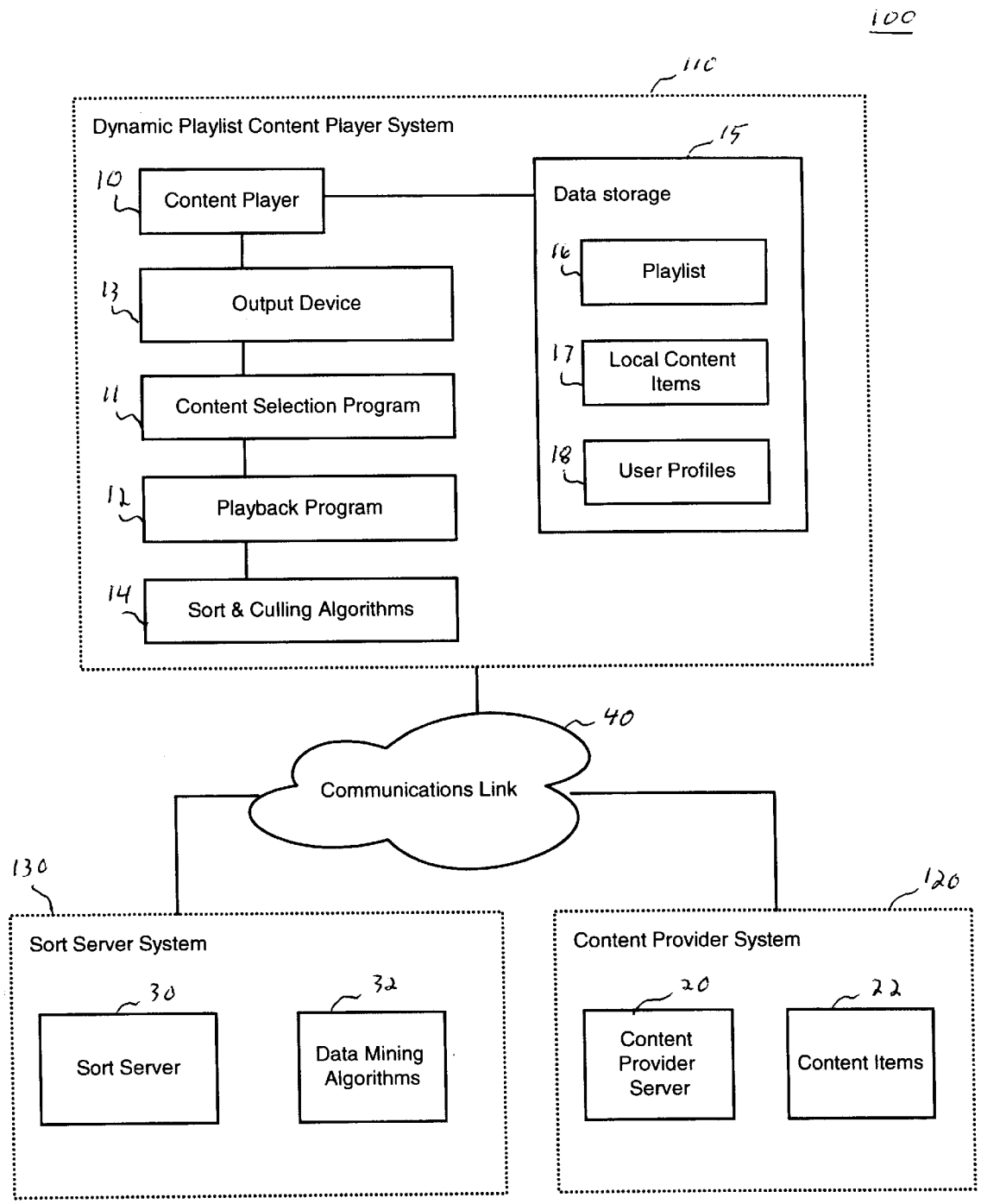
FIG. 2 is a simplified schematic drawing showing more details the system shown in FIG. 1.

FIG. 2 shows the arrangement of FIG. 1 in greater detail, including a simplified schematic diagram of the major functional components of the dynamic playlist system 100. The arrangement of FIG. 2 is one of many possible arrangements of the functional elements of the present invention and serves to facilitate their description and general concept of the present invention. Other arrangements will be described later.

The dynamic playlist system 100 is conceptionally organized into three separate systems, including a dynamic playlist content player system 110 and content provider server system 120 arranged to operate in a known client-server mode. Sort server system 130 is optional to the extent that its function is to provide sophisticated filtering services by way of collaborative filtering algorithms, and operates in support of the dynamic playlist content player system 110 in those embodiments calling for such services. Moreover, content item storage can be a shared function with local storage being locally accessible by dynamic playlist content player system 110 with additional content being accessible from remote storage associated with one or more content provider systems 120.

The dynamic playlist client system 110 includes a content player 10, which includes known devices for playback of audio or video files, taking the form of popular computer programs for use on personal computers, as well as integrated video and audio stereo systems. In the preferred embodiment, content player 10 is operably connected to a content selection program 11 and a playback program 12 arranged to operatively control peripheral devices including an output device 13, which can be any device configured to play or display file objects such as, for example, audio, graphic, and video files. Video files can include motion picture films, computer games, and the like. Content player 10 also includes, and is operably responsive to, known input, display, memory, and processor devices commonly associated with computers. Content player 10 includes a data storage device 15 configured to operate one of any type of data storage model, including, but not limited to, a relational data base. Regardless of the data storage model employed, data storage device 15 includes storage of a meta-data playlist 16, optional storage of local content items 17, and at least one user profile 18, all to be described later.

The content provider system 120 includes a content provider server 20, which is a local storage system 22 configured for storing content items, such as, for example, audio or video content items. The content items stored on content provider system 20 are stored in any of the known data storage models, such as, for example, a relational database. Stored content items are associated with respective meta-information, both of which can be accessed over communication interface 40 by content selection program 11 located on content player 10. As discussed in detail below, retrieved content items optionally can be post-processed by data mining relational algorithms 32 located on sort server 30 and sorting and culling algorithms 14 associated with the content player 10, and then output on output device 13. Any of the known relational algorithms can be used in connection with the present invention and all variations of algorithm type and installation configurations are intended to be included within the scope of the present invention, such as, for example, the Firefly system as disclosed in U.S. Pat. No. 5,749,081, the Hey systems as disclosed in U.S. Pat. Nos. 4,870,579 and 4,996,642, or the approaches in the Rose system as disclosed in U.S. Pat. No. 5,724,567. All variations of algorithm type and installation configurations are intended to be included within the scope of the present invention.

A sort server system 130 includes a server 30 configured to run profile based subjective recommendation or data mining algorithms 32, which also are not shown in detail, as their use is well-known and commonly used in the art of collaborative and recommendation filtering. Alternatively, algorithms 32 can be located at any of the three computers 10, 20, and 30, provided sufficient computational power and network throughout are available. The sort server 30 is comprised of a known collaborative filtering engine and a pairing sort system, as described in FIGS. 6 and 7.

It should be understood that the present invention might be readily adapted for alternate embodiments and modes of operation. For example, the content selection program 11 and playback program 12 could be accomplished using the directory structure of a hard drive, or the indexed database of content to which a user has access. The dynamic playlist system could be implemented in a variety of devices and mediums. For example, a computer program written in any of the many languages such as C++, that would allow advanced data structures on any platform that would allow content playback, could serve as the playlist content player 10. Another form of the playlist content player 10 could take the form of a set top television box, or be within a stereo sound system, with the database of available titles being stored either within the devices themselves, or on a remote server system, which, potentially, can also serve the content. Additionally, aspects of the sort server system 130 and the content provider system 120 can be integrated into the content player system 110.

Figure 3:
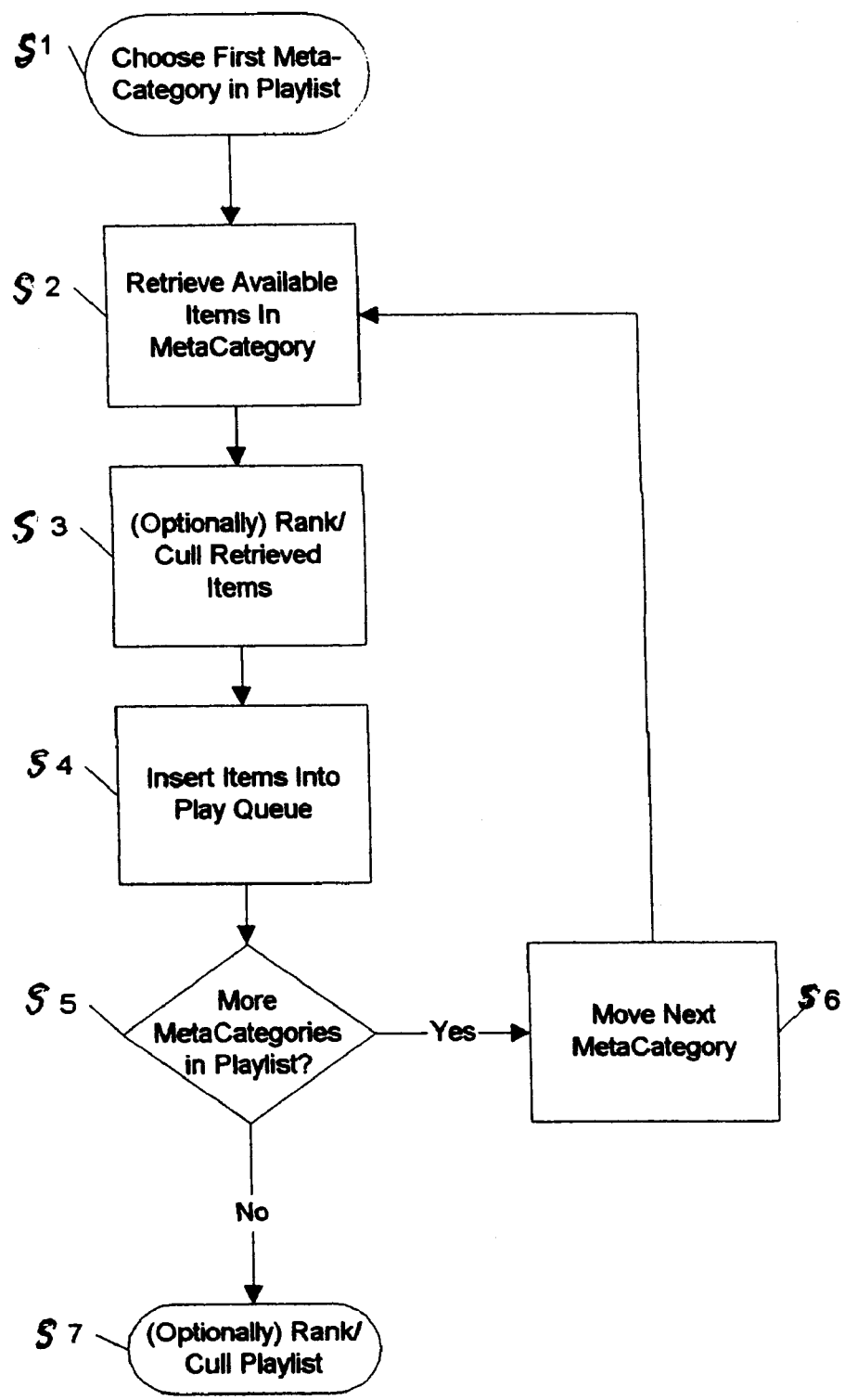
FIG. 3 is a logic flow diagram of the basic mode dynamic playlist algorithm according to the present invention.

FIG. 3 is a simplified flow diagram illustrating operation of one embodiment, the basic form, in which only a content provider 120 and a playlist consumer 110 are required. At step S1, when a playlist is executed, the playlist consumer picks a seed meta-category from the playlist. At step S2, It then queries available content providers for all content pieces fitting the seed meta-category. At step S3, optionally, it then applies ranking or culling algorithms to the results, such as randomly removing elements, or only keeping the top N most popular result items. Next, at step S4 it inserts the results into the play queue, and continues at steps S5 and S6 to the next meta-category in the playlist and repeats the process. Finally, at step S7, it performs an optional ranking or culling sort on the play queue, such as randomizing the play order, and begins playback. This mode of operation can be implemented in a non networked environment, but is less powerful than the recommendation mode of operation, to be described next, as it cannot apply advanced sort routines to the playlist. However, it does allow a playlist can be unique each time it is expanded, and can add new content without having to modify the playlist when the content providers make new content accessible.

Figure 4:
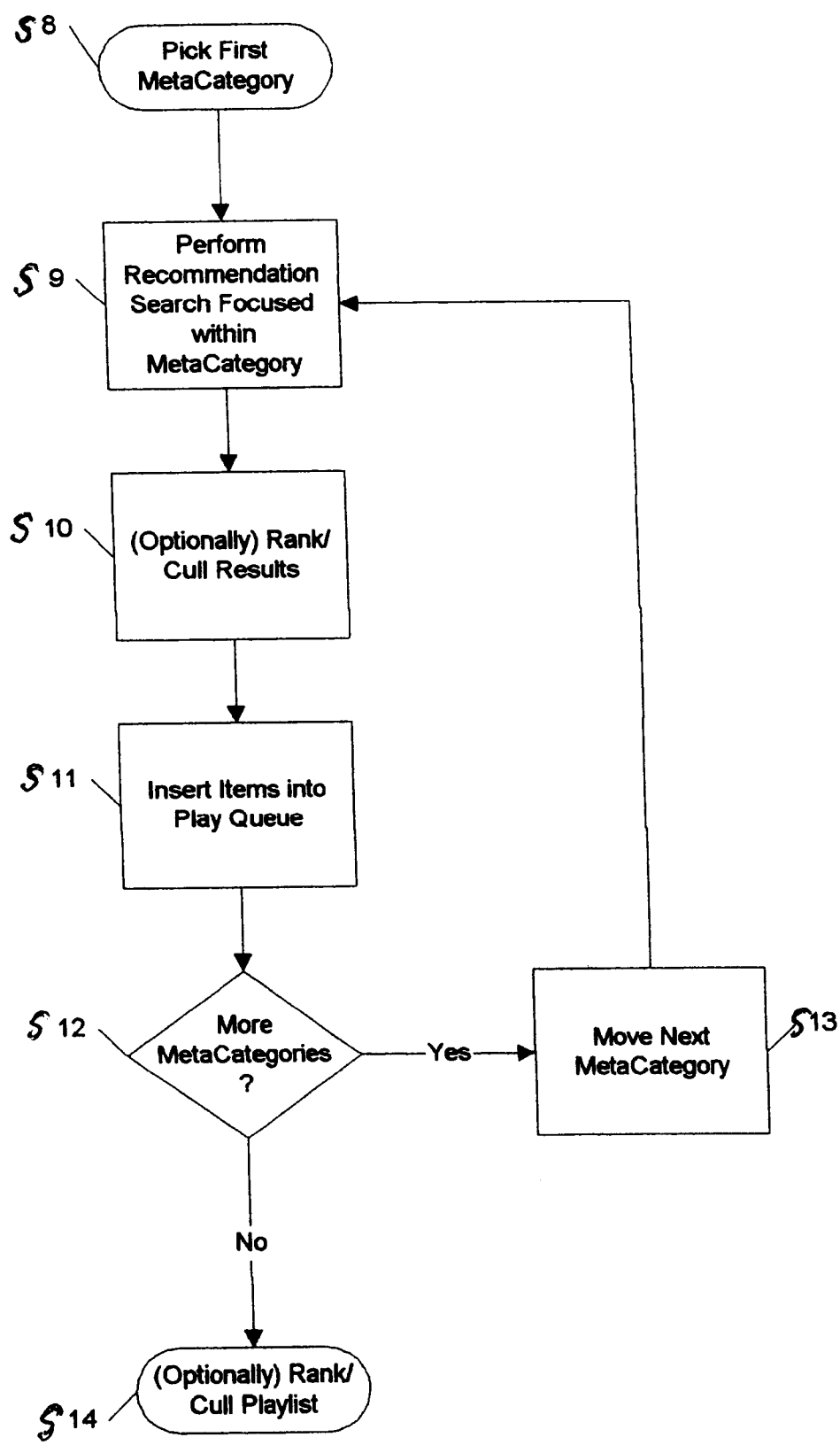
FIG. 4 is a logic flow diagram of the recommendation mode dynamic playlist algorithm according to the present invention.

FIG. 4 is a simplified flow diagram illustrating operation of one alternate embodiment, called the recommendation form, in which a third system element, sort server system 130, is added to the basic form illustrated in FIG. 3. The addition of a central sort server system 130 allows advanced profile based collaborative filtering or pairing sort queries to be performed upon the dynamic playlists. In operation, the recommendation form playlist expansion is similar to that of the basic form, with the addition of the more sophisticated sort algorithms ranking and culling results after each step.

At step S8, a meta-category is chosen as the seed from the playlist. At step S9, the content providers are queried for available content in the seed meta-category and then the result content list is ranked and culled by performing a collaborative filtering query based on any static items within the playlist, with any results not in the content list received from the content providers discarded. At optional step S10, any additional ranking or culling algorithms can be performed, such as randomly discarding some elements, or ranking based on raw popularity. Next, at steps S11–S13 the content list is inserted into the play queue, and the next meta-category in the playlist is chosen. At that point the process is repeated, using the results currently in the play queue to seed a collaborative filtering request after each list of available content pieces is returned from the content providers. Upon seeding the play queue with all meta-categories, a final ranking and culling pass can be performed, using any of the common playlist manipulation algorithms, and optionally, a pairing sort algorithm, to be described in connection with FIGS. 6 and 7.

Finally, playback can commence. As items are played back from the play queue, the system also reports to the sort server that the user has listened to the item, to allow the collaborative filtering system to increase its understanding of the content. Additionally, each time two songs are listened to in sequence, their pairing is submitted to the sort server's pairing sort system to allow the pairing sorted to increase its understanding of the content as well.

Figure 5:
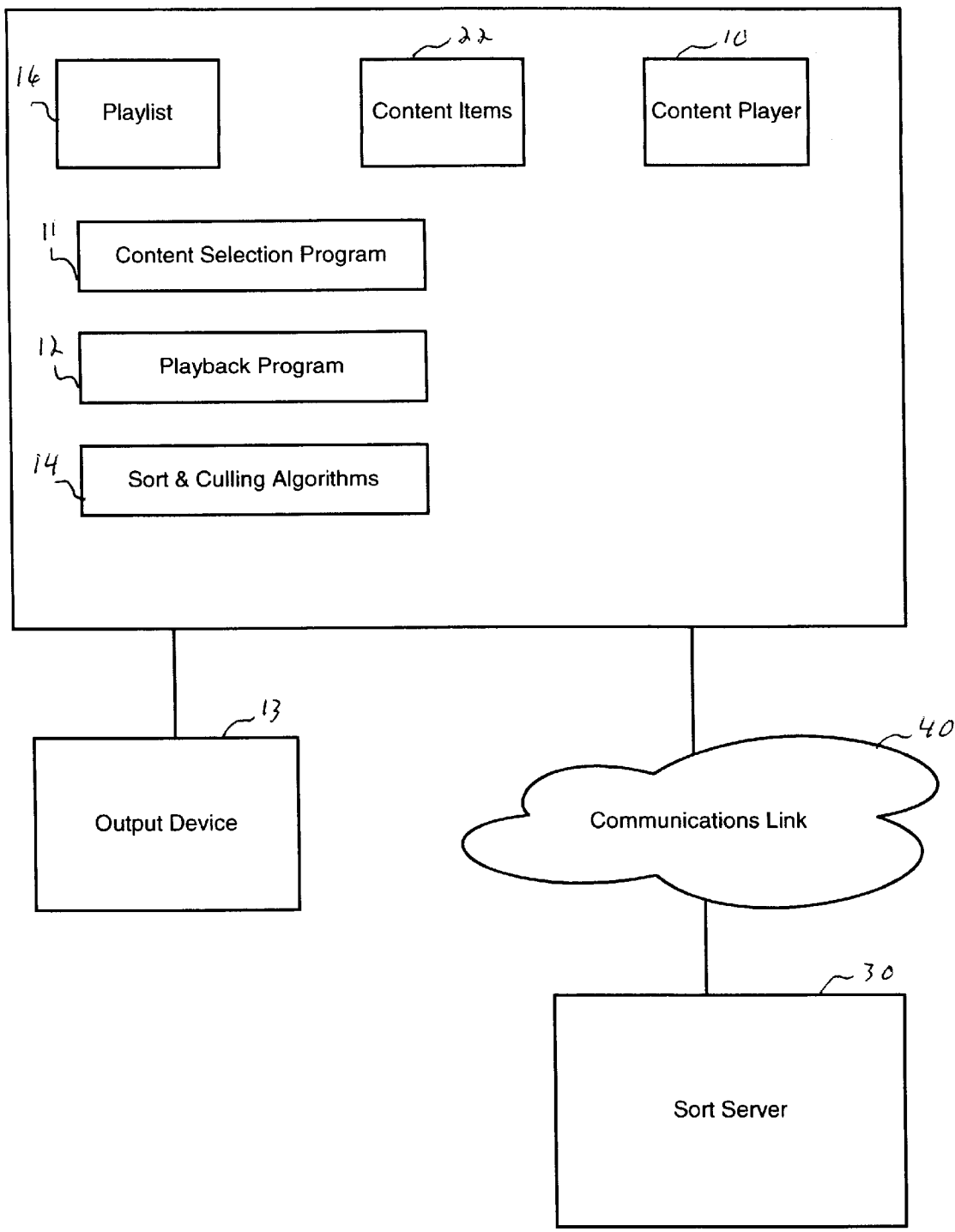
FIG. 5 is a schematic drawing of the recommendation mode dynamic playlist algorithm according to the present invention.

FIG. 5 is a preferred rearrangement of the "client-server" configuration shown in FIG. 2, wherein elements in common between FIGS. 2 and 5 share common reference numerals. Dynamic playlist content player 50 serves as content player 10 and further includes local content storage functionality as well as operating to access content stored remotely at content provider 120. This jukebox style arrangement includes a program configured to access aspects of sort server 30 and content provider system 20. The content player 10 is operably connected with content selection program 11, the playback program 12, at least one sorting and culling algorithm program 14, stored content items 22, and an output device 13.

In operation, the dynamic playlist content player system 50 preferably is connected over the Internet to a separate sort server system 130, and is configured to access both local content 22 and available streamable content 22 from content provider systems 120. Thus, many content players can access any of multiple content provider systems as well as their respective individually stored content. The content provider systems 120 include a known indexed database of content items and respective meta-information. The content provider system is implemented using a relational database such as, for example, the Oracle™ relational database. The content providers serve their available content by any known means, such as, for example, through a streaming media server like RealServer™ or via known direct http streaming systems, such as Icecast™.

In the preferred embodiment, a user using system 50 builds a playlist containing both local content items and streamable items. The playlist is a stored index of meta-data elements each having an association with separately stored one or more content items. The content items may be stored locally or are streamable from a remote content provider. The meta-data elements can be of any configuration, and preferably include descriptors of at least one associated content item and optionally include descriptors relating to preferences of one or more users.

When the user plays the playlist, the playlist is submitted to the sort server system 130, which performs the algorithm described in connection with FIG. 2 to expand all meta-categories into specific content items, by drawing upon the content available from the user's locally stored content pool and from streaming content providers. The system the returns the expanded playlist to the jukebox program, which then uses the playlist like a standard static playlist. Optionally, when the user expresses dislike for a particular content item, either by skipping the item or through a rating system, the system records such instances in the meta-data associated with the user, i.e., the user profile. Upon resubmission of the playlist to the sort server, a new playlist now adapted to the expressed tastes of the playlist listener is generated and the rejected content items are not selected based on the updated user profile. After the user stops or plays completely through the playlist, the list is submitted to the sort server to execute a pairing algorithm, described in connection with in FIGS. 6 and 7, to allow the pairing sort engine shown in FIG. 6 to further adapt to how the user ordered the playlist.

FIG. 6 is a simplified schematic diagram of a sample pairing sort engine suitable for use by dynamic playlist system 100 to further adapt to how the user ordered the playlist. Other pairing algorithms which produce comparable results are also suitable in the present invention. CPU 60 receives input 62 in the form of the playlist as executed by the user using dynamic contest content player system 110. CPU 62 applies a flow order sort algorithm, or pair sort algorithm, illustrated in FIG. 7, to input 62 and updates elements table 64 and pairs table 66, stores the result for further use and optionally makes the result available on display 68.

Figure 7:
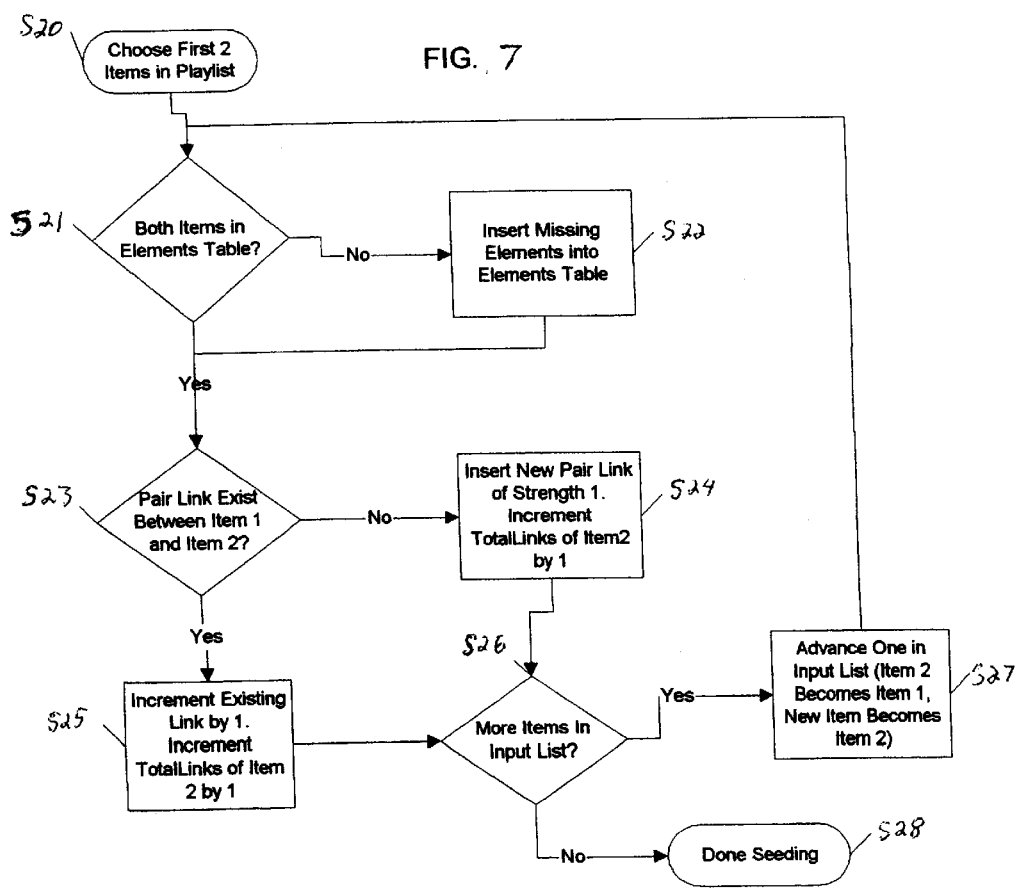
FIG. 7 is a logic flow diagram of a sample pairing sort seed algorithm according to the present invention.

FIG. 7 is a simplified flow diagram of the flow order sort algorithm used in the sample pairing sort engine shown in FIG. 6. At step S20, system 100 selects the first two items, item 1 and item 2, in the playlist. At steps S21 and S22, if it is determined that both items (elements) are not in the elements table 64 shown in FIG. 6, then the missing items(s) are inserted into table 64. At steps S23–S25, the system increments a weight between the first item and the second item. This is accomplished, by determining that both items are in the elements table and whether a pair link exists between item 1 and item 2. If a pair link does not exist, then at step S24, a new pair link of strength 1 is inserted between items 1 and 2 and a TotalLinks counter of item 2 is incremented by 1. If a pair link does exist between items 1 and 2, then at step S25, the existing link in incremented by 1 and the TotalLinks counter of item 2 is incremented by 1. In either case, after the appropriate insertion step, step S26 determines whether more items exist in the playlist. If yes, at step S27, the inquiry is advanced by one item in the playlist so that item 2 becomes item 1 and a new item becomes item 2. If no more items remain in the playlist, then at step S28, the sort ends.

Figure 8:
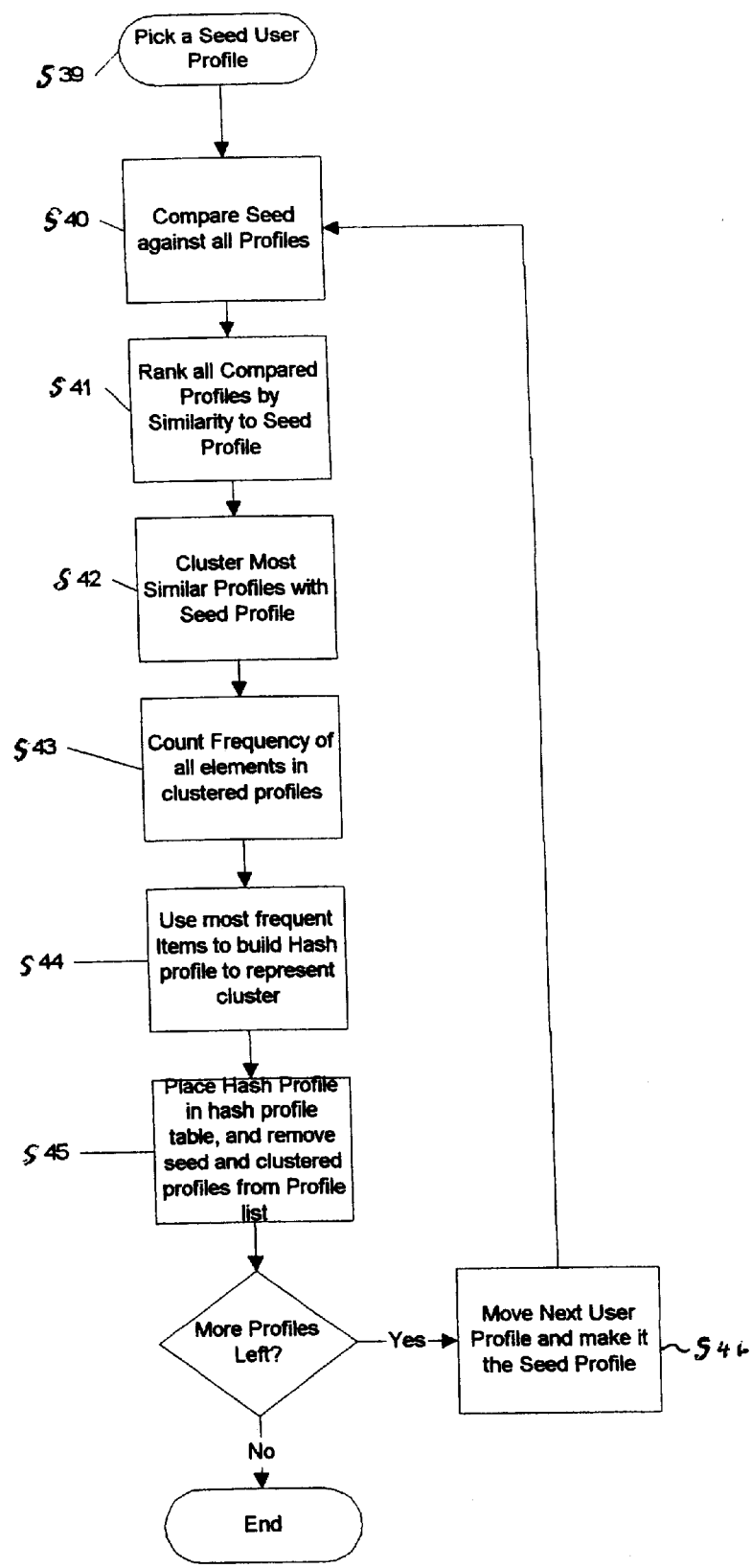
FIG. 8 is a simplified logic flow diagram of a hash clustering system according to the present invention.

FIG. 8 is a simplified flow diagram of a hash clustering system according to the present invention in which successive seed profiles are compared with all profiles. At step S39, the dynamic playlist system 100 selects a user profile 18 from storage 17 and at step S40, compares the seed against all profiles available to system 100. At step S41, all compared profiles are ranked by similarity to the selected seed profile. At step S42, the most similar profiles are clustered with the seed profile, and at step S43, the frequency of all elements in the clustered profiles are counted. At step S44, the most frequent items are used to build a hash profile to represent each respective cluster, and at step S45, the respective hash profile is placed in a hash table and the seed and clustered profiles are removed from the profile list. If more profiles are left to be considered, then at step S46, select the next user profile, make it the seed profile, and continue the sequence at step S40.

While this invention has been described in conjunction with specific embodiments thereof, it is evident that many alternative modifications and variations will be apparent to those skilled in the art. Accordingly, the preferred embodiments of the invention as set forth herein are intended to be illustrative, not limiting. Various changes may be made without departing from the true spirit and scope of the invention as defined in the following claims.

What is claimed is:

1. A dynamic playlist computer system for creating a dynamic playlist comprising:
   a storage component configured to store an elements table and a pairs table;
   a first component configured to accept at least one meta-category, said at least one meta-category being a set of at least one criterion, said at least one criterion having a potential association with a content item;
   a second component configured to retrieve from at least one content provider a result set of meta-data fitting any said at least one criterion, wherein said result set enables acquisition of content items associated with said meta-data;
   a third component configured to insert the result set to said dynamic playlist; and
   a fourth component configured to seed a next meta-category, if any, with the result set.

2. The dynamic playlist client system set forth in claim 1 further comprising a fifth component configured to reorder the dynamic playlist after insertion of the at least one content item into the dynamic playlist.

3. The dynamic playlist client system set forth in claim 1 further comprising a sixth component configured to reorder the dynamic playlist after insertion of the at least one content item into the dynamic playlist.

4. The dynamic playlist client system set forth in claim 3 further comprising a component for culling the at least one content item, whereby at least one of the at least one content item is removed.

5. The dynamic playlist client system set forth in claim 1 further comprising a sort server configured to perform collaborative filtering and paring sort calculations, said sort server being connected to said client component over the communications interface.

6. A method for creating a dynamic playlist, the dynamic playlist including meta-data having association with a respective content item configured to be played on a content player, the method comprising the steps of:
   accepting at least one meta-category, said at least one meta-category being a set of at least one criterion, said at least one criterion having a potential association with a content item;
   retrieving from at least one content provider a result set of meta-data fitting any said at least one criterion, wherein said result set enables acquisition of content items associated with said meta-data;
   inserting the result set to said dynamic playlist; and
   seeding a next meta-category, if any, with the result set and repeating said retrieving, inserting and seeding steps until all meta-categories have been processed.

7. The method for creating a dynamic playlist set forth in claim 6 wherein, the method further comprises applying a reordering algorithm to the result set to obtain the dynamic playlist.

8. The method for creating a dynamic playlist set forth in claim 7 wherein said reordering algorithm is selected from a group of algorithms including a ranking algorithm, a random element removal algorithm and a retention of top N most popular elements algorithm.

9. The method for creating a dynamic playlist set forth in claim 6 further comprising the step of applying an ordering algorithm to the dynamic playlist.

10. The method for creating a dynamic playlist set forth in claim 6 wherein said ordering algorithm is a random reordering algorithm.

11. The method for creating a dynamic playlist set forth in claim 6 wherein said at least one content provider is a provider selected from a group of providers including a local music collection, a central content server, and a peer-to-peer computer system.

12. A method for creating a dynamic playlist, the dynamic playlist including meta-data having association with a respective content item configured to be played on a content player, the method comprising the steps of:
    accepting at least one meta-category, said at least one meta-category being a set of at least one criterion, said at least one criterion having a potential association with a content item;
    retrieving from at least one content provider a result set of meta-data fitting any said at least one criterion, wherein said result set enables acquisition of content items associated with said meta-data;
    calculating a filtered result set by application of a collaborative filtering query algorithm to the result set;
    inserting said filtered result set to said dynamic playlist; and
    seeding a next meta-category, if any, with the result set and repeating said retrieving, calculating, inserting and seeding steps until all meta-categories have been processed.

13. The method for creating a dynamic playlist set forth in claim 12 wherein the collaborative filtering query algorithm includes user play pattern data, said user play pattern including at least one manual intervention detected during playing of contents associated with the dynamic playlist.

14. The method for creating a dynamic playlist set forth in claim 12 wherein said at least one content provider is a provider selected from a group of providers including a local music collection, a central content server, and a peer-to-peer computer system.

15. The method for creating a dynamic playlist as set forth in claim 14 wherein the collaborative filtering query algorithm includes rating data, said rating data being indicative of preference and distaste for selected content items.

16. The method for creating a dynamic playlist set forth in claim 15 wherein, the method further comprises the step of applying a first reordering algorithm to the filtered result set.

17. The method for creating a dynamic playlist set forth in claim 16 wherein said first reordering algorithm is selected from a group of algorithms including a ranking algorithm, a random element removal algorithm, a retention of top N most popular elements algorithm, and a pairing sort algorithm.

18. The method for creating a dynamic playlist set forth in claim 17 further comprising the step of applying an second reordering algorithm to the dynamic playlist.

19. The method for creating a dynamic playlist set forth in claim 18 wherein said second reordering algorithm is a random reordering algorithm.

20. The method for creating a dynamic playlist set forth in claim 19 wherein each instance of said meta-data comprises an element and said pairing sort algorithm comprises the steps of:

selecting a first and second element from the playlist;

determining if both elements are in an elements table and inserting whichever element is missing into the elements table;

incrementing a weight between the first element and the second element; and determining that another element remains in the playlist and if present, identifying said first element as said second element and said another element as said second element, and repeating said determining, incrementing and inserting steps until no elements remain in the playlist.

21. The method for creating a dynamic playlist set forth in claim 20 wherein said at least one meta-category is at least one user profile having associated elements, the method further comprising the steps of:

selecting a seed user profile;

comparing the seed user profile against all available profiles;

ranking all compared profiles by similarity to the selected seed profile;

clustering the most similar profiles with the seed profile;

counting the frequency of all elements in the clustered profiles;

building a hash profile of the most frequent items to represent each respective cluster;

placing the respective hash profile in a hash table;

removing the seed and clustered profiles from the profile list;

identifying a next user profile, if available, as the seed user profile; and continuing said comparing through identifying steps until no profiles are available.

22. A method for creating a dynamic playlist, the dynamic playlist including meta-data having association with a respective content item configured to be played on a content player, the method comprising the steps of:

accepting at least one meta-category, said at least one meta-category being a set of at least one criterion, said at least one criterion having a potential association with a content item;

retrieving from at least one content provider a result set of meta-data fitting any said at least one criterion, wherein said result set enables acquisition of content items associated with said meta-data, said at least one content provider being a provider selected from a group of providers including a local music collection, a central content server, and a peer-to-peer computer system;

calculating a filtered result set by application of a collaborative filtering query algorithm to the result set;

applying a reordering algorithm to the filtered result set, said reordering algorithm being selected from a group of algorithms including a ranking algorithm, a random element removal algorithm, a retention of top N most popular elements algorithm, and a pairing sort algorithm;

inserting said filtered result set to said dynamic playlist; and seeding a next meta-category, if any, with the result set and repeating said retrieving, calculating, inserting and seeding steps until all meta-categories have been processed.

23. The method for creating a dynamic playlist set forth in claim 22 wherein each instance of said meta-data comprises an element and said pairing sort algorithm comprises the steps of:

selecting a first and second element from the playlist;

determining if both elements are in an elements table and inserting whichever element is missing into the elements table;

incrementing a weight between the first element and the second element; and determining that another element remains in the playlist and if present, identifying said first element as said second element and said another element as said second element, and repeating said determining, incrementing and inserting steps until no elements remain in the playlist.

24. The method for creating a dynamic playlist set forth in claim 23 wherein said at least one meta-category is at least one user profile having associated elements, the method further comprising the steps of:

selecting a seed user profile;

comparing the seed user profile against all available profiles;

ranking all compared profiles by similarity to the selected seed profile;

clustering the most similar profiles with the seed profile;

counting the frequency of all elements in the clustered profiles;

building a hash profile of the most frequent items to represent each respective cluster;

placing the respective hash profile in a hash table; removing the seed and clustered profiles from the profile list;

identifying a next user profile, if available, as the seed user profile; and continuing said comparing through identifying steps until no profiles are available.

* * * * *